United States Patent [19]

Lundahl et al.

[11] 4,206,506

[45] Jun. 3, 1980

[54] FOLIAGE CONTROL SYSTEM

[75] Inventors: Ezra C. Lundahl, Providence; Brent W. Brown, Smithfield, both of Utah

[73] Assignee: Ezra C. Lundahl, Inc., Logan, Utah

[21] Appl. No.: 917,996

[22] Filed: Jun. 22, 1978

[51] Int. Cl.$^2$ .................. G01G 19/08; G06F 3/05
[52] U.S. Cl. .................. 364/567; 414/21; 177/136; 222/77
[58] Field of Search .................. 364/567; 177/1–3, 177/136, 211, 15–17, 64, 59–60; 214/2; 222/55, 58, 77; 414/21

[56] References Cited

U.S. PATENT DOCUMENTS

| | | | |
|---|---|---|---|
| 3,295,698 | 1/1967 | Ross et al. | 177/59 X |
| 3,363,707 | 1/1968 | Murray et al. | 177/136 |
| 3,529,139 | 9/1970 | Godwin | 177/59 X |
| 3,605,089 | 9/1971 | Gray | 177/17 X |
| 3,650,340 | 3/1972 | Bradley | 177/136 |
| 3,727,706 | 4/1973 | Streeter et al. | 177/1 |
| 3,750,158 | 7/1973 | Anastassakis | 177/1 X |
| 3,863,724 | 2/1975 | Dalia, Jr. | 177/1 X |
| 4,044,920 | 8/1977 | Swartzendruber | 222/58 |
| 4,055,255 | 10/1977 | Vasquez | 214/2 |
| 4,127,220 | 11/1978 | Werthaiser et al. | 222/77 X |

Primary Examiner—Edward J. Wise

Attorney, Agent, or Firm—Lynn G. Foster

[57] ABSTRACT

A system for weighing and placing stacked foliage in inventory and for, thereafter, precisely determining and feeding a metered or controlled amount of foliage material from inventory on a stack-by-stack basis. A foliage stacking machine is used to stack, weigh and place the foliage in cumulative inventory. A stack feeder is used from time to time to feed to livestock predetermined and metered amounts of foliage from successive stacks taken from inventory, while continuously monitoring the cumulative amount of foliage in inventory. Electronic strain gauges are disposed upon the frame of both the stacking machine and the stack feeder which strain gauges are calibrated to provide a total stack weight readout (at any time before, during or after each feeding operation). A calculator for determining the amount of feed to be discharged on each occasion is provided. The capacity to preset the stack feeder to discharge only a said predetermined amount of foliage and to provide a continuous instantaneous readout of the amount of foliage actually discharged from a stack at any point in time during feeding operation is available. A continuous readout of the instantaneous amount of foliage remaining in inventory is provided.

5 Claims, 6 Drawing Figures

FOLIAGE CONTROL SYSTEM

BACKGROUND

1. Field of Invention

The present invention relates broadly to automated gathering, stacking and subsequent distribution of foliage. More particularly, the present invention relates to weighing foliage in transit as it is stacked in one or more machines and thereafter placing the stacks in storage or inventory; later the invention accommodates predetermining the amount of foliage from time to time to be fed from inventory to livestock, restricting the magnitude of foliage actually fed to said predetermined amount while monitoring the stacked foliage in inventory at all points in time.

2. Prior Art

It is known to form compressed stacks of foliage in a stack machine, from which the stacks are unloaded. See the prior art cited in copending U.S. Patent application Ser. No. 900,560, filed Apr. 27, 1978, assigned to the assignee of the present invention. It is also known to provide a stack feeder for cutting foliage from a stack loaded upon the feeder. See U.S. Pat. Nos. 3,741,051; 3,773,269; 3,830,438 and 4,037,740. Notwithstanding the existence of stacking machines and stack feeders for an interval for many years, precise evaluation of the quantity of foliage available and precise distribution to livestock of the foliage has not been available, proposed, suggested or implied by the prior art. Thus, the cattle rancher, for example, has been unable to accurately determine whether or not his need for foliage will equal or exceed his supply, resulting in a failure to timely buy or sell foliage. Furthermore, guess work has been used in dispensing stored foliage to livestock; thus, costly under and over feeding has been commonplace.

BRIEF SUMMARY AND OBJECTS OF THE INVENTION

The present invention substantially alleviates or overcomes the above-mentioned limitations of the prior art by providing a novel system including methods and apparatus by which the farmer may control his inventory of stacked foliage. In brief summary, the system comprises weighing in transit each man made stack of foliage as it is formed and placed in inventory and monitoring the amount of stacked foliage in inventory as the magnitude thereof is caused to vary. The system further comprises accurately ascertaining the amount of foliage to be fed to stock or processed at any particular point in time and precisely dispensing that exact amount and no more from a stack feeder. Variations in stack density and moisture can in this way be taken into account. Arrangements can be made to have in storage or otherwise available the amount of stacked foliage needed for livestock over the winter months and the precise amount of foliage adequate for good nutrition to be supplied to the livestock at each feeding. The ongoing inventory of foliage remaining in storage during and after each feeding is monitored.

Accordingly, it is a primary object of the present invention to provide simplified and novel apparatus for and methods of controlling (a) the creation and storage of machine-made foliage stacks and (b) the precise feeding of foliage from the stacks.

It is a further important object of the present invention to provide a system for in transit weighing and placing stacked foliage in inventory.

It is a further significant object of the present invention to provide a system for precisely determining and feeding a metered or controlled amount of foliage from stacks in inventory.

A further paramount object of the present invention is to provide for stacking, weighing and placing of foliage in inventory and monitoring at all times the magnitude of said inventory.

A further important object of the present invention is the feeding to livestock of predetermined and metered amounts of foliage from inventory, which inventory is monitored substantially continuously.

A further primary object of the present invention is to provide a system whereby stacked foliage is placed into and removed from inventory with the magnitude of said inventory being monitored substantially continuously on an in transit basis.

A further significant object is to provision of a system for precisely feeding the proper nutritional amount of foliage requisite to the needs of livestock.

It is a further object of the present invention to avoid the need of an expensive permanent scale installation and any requirement that vehicles travel to a permanent scale installation while at the same time controlling and monitoring the magnitude of stacked foliage placed into and removed from inventory.

Another important object is the inventorying and periodic updating of the inventory of stacked foliage harvested and placed in storage as well as foliage removed from storage fed to livestock.

Another paramount object of this invention is the provision of a system for selecting a predetermined amount of foliage to be dispensed, from a stack feeder, dispensing the same and issuing a warning when the predetermined amount has been dispersed.

These and other objects and features of the present invention will become apparent from the detailed description taken in respect to the accompanying drawings.

DETAILED DESCRIPTION OF THE ILLUSTRATED EMBODIMENT

Figure 1:
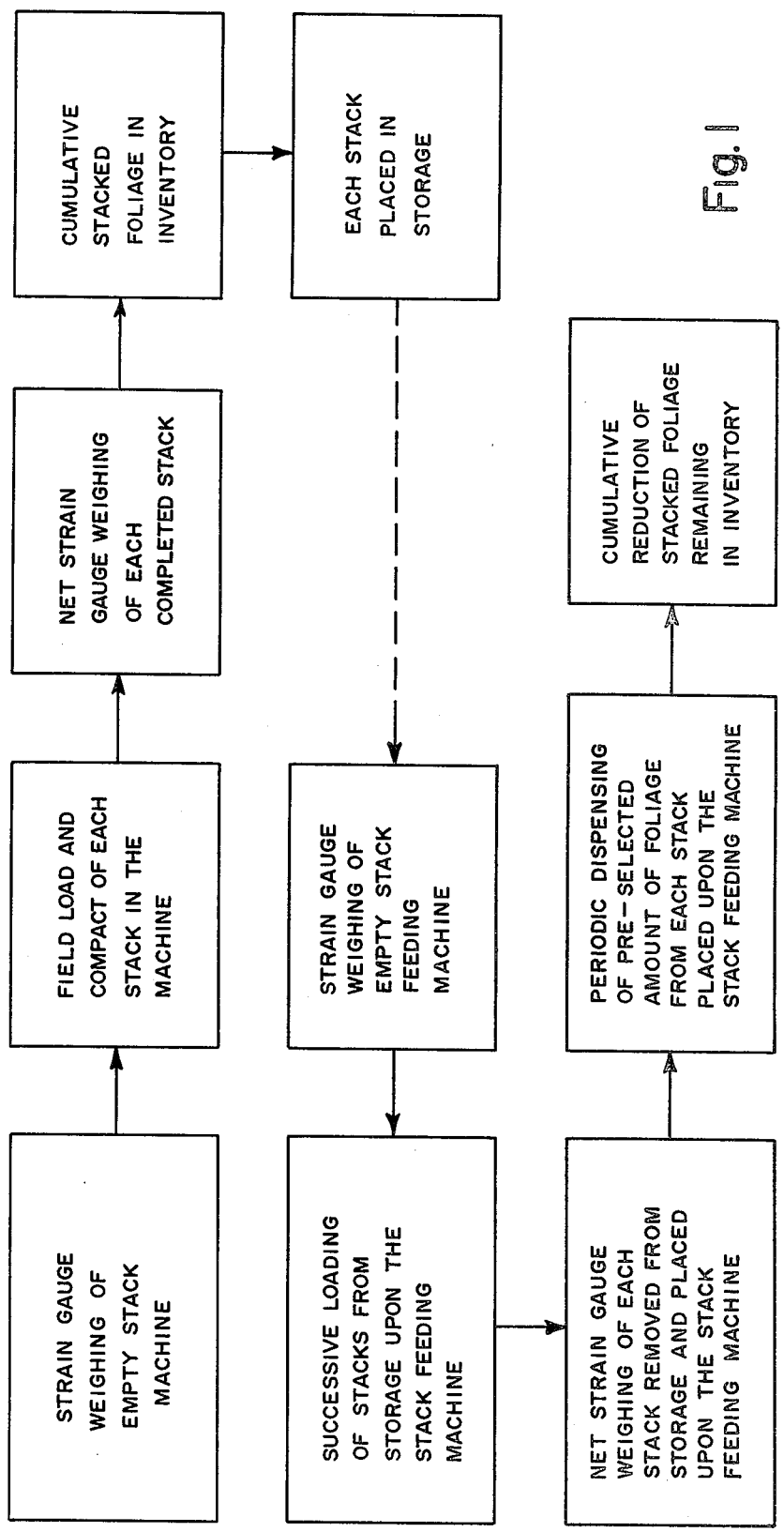
FIG. 1 is a functional block diagram of the preferred method according to the present invention of harvesting and placing stacked foliage in storage and removing the same from storage on a precisely controlled basis.
Figure 2:
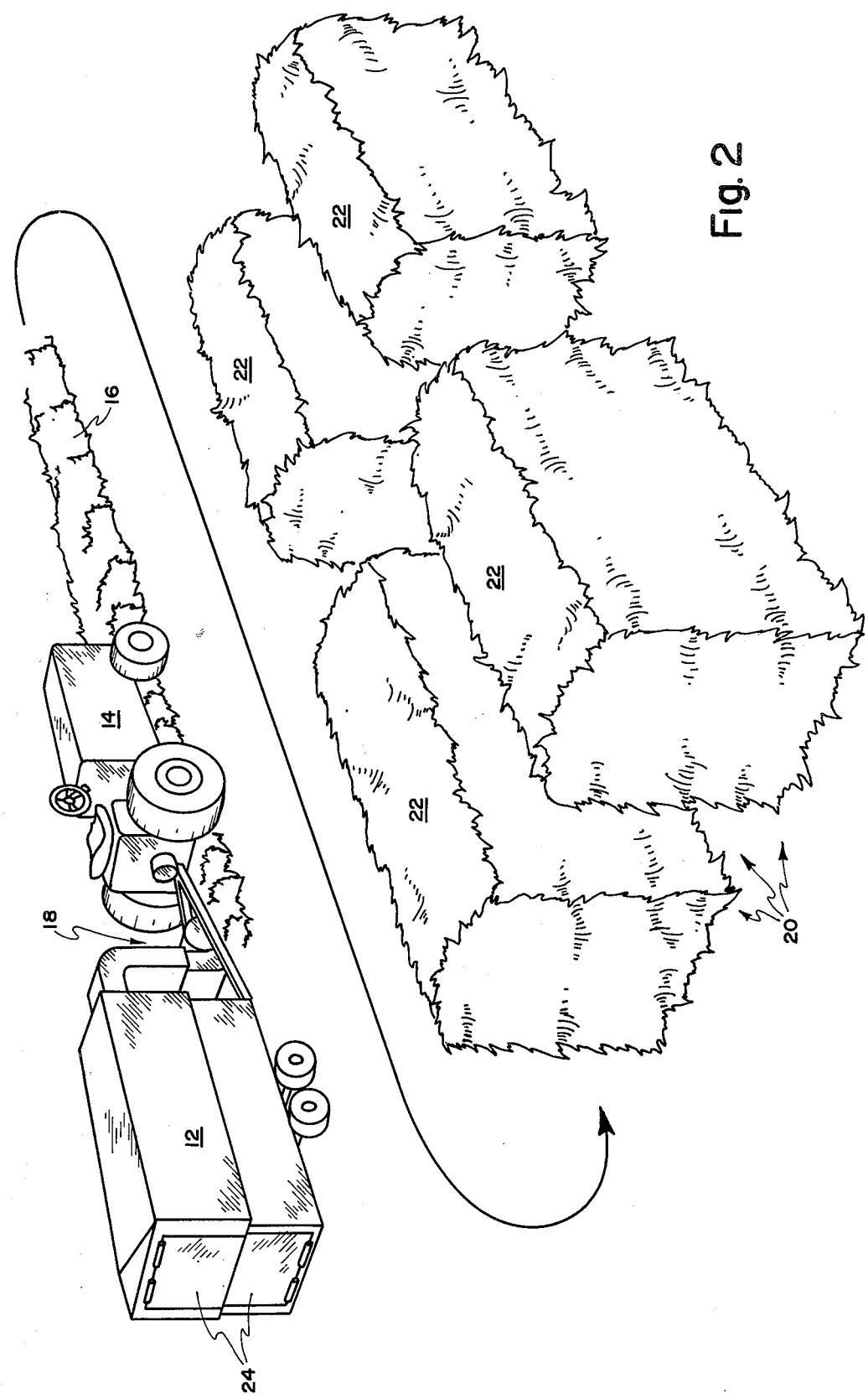
FIG. 2 is a schematic perspective representation of the preferred manner by which foliage is harvested and placed in storage according to the present invention.

Reference is now made to the drawings wherein like numerals are used to designate like parts throughout. In particular, the top part of the flow diagram of FIG. 1 and FIG. 2 illustrate the initial portion of the presently preferred system according to the invention. It is contemplated that one or more stack making machines 12 will be provided for field use. The stack making machine 12 is illustrated in FIG. 2 as being connected to and propelled by a conventional farm tractor 14. Any type of stack making vehicle may be used such as the one disclosed in copending U.S. Patent application Ser. No. 900,560, filed Apr. 27, 1978, assigned to the assignee of the present invention, the description of which is incorporated herein by reference. Any of the stack making vehicles of the prior art cited in said U.S. Patent application Ser. No. 900,560 may be used.

Stack making machines as contemplated by the present invention are caused to be displaced in a field of cut foliage 16, (FIG. 2) such that the foliage, disposed as a windrow or otherwise, is caused to be picked up by the stack maker 12 via pickup unit 18, distributed within the interior of the stack maker 12 and periodically compacted. In this way a compressed stack of foliage is created within the interior of the stack maker 12.

Again as illustrated in FIG. 2, the stack making machine 12 with a completed stack therein is caused to be displaced from the field site of cut foliage to a storage site 20 where the stack is unloaded. While any suitable site may be used, it is common to select a substantially level somewhat elevated piece of ground having good drainage characteristics and to place a plurality of said stacks 22 in storage at site 20 in close proximity one to the next. This conserves space and prevents or substantially alleviates damage to the stacks due to moisture from precipitation, irrigation and the like. Conventionally available stack making vehicles 12 comprise tail gate structure 24 and stack conveying structure (not shown) by which each stack 22 is unloaded upon the ground. Normally, the bed of the vehicle 12 is caused to be tilted during the unloading operation.

The frame of the stack making machine 12 is equipped with a network of strain gauges 30, appropriately located consistent with previous practice and empirical data for any type of frame. Strain gauge placement upon the frame of vehicles is taught by U.S. Pat. Nos. 3,669,756 and 3,650,340, which are incorporated herein by reference. Of course, any arrangement of strain gauges upon the frame which yields accurate results may be used. While any other suitable strain gauge may be used, it is presently preferred that each strain gauge comprise product CEA-06-250VW-120, available from Micro Measurements of Romulus, Mich.

Figure 4:
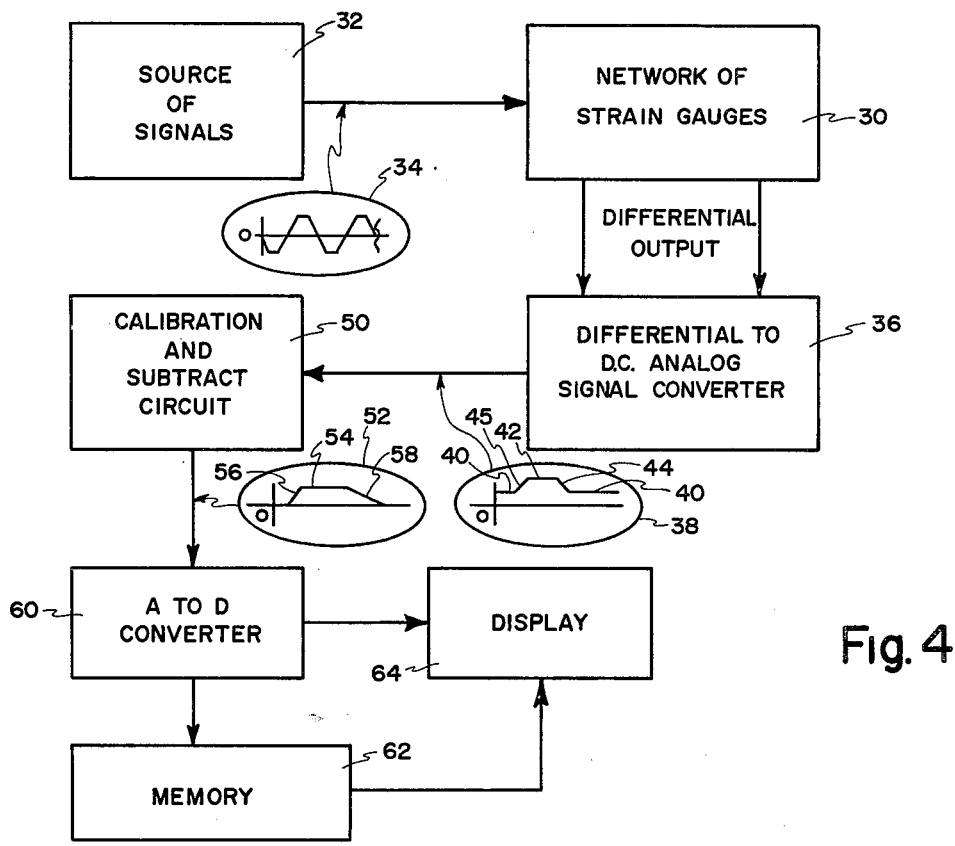
FIG. 4 is a block diagram of a presently preferred control system of the present invention.

As illustrated in FIG. 4, the network of strain gauges 30 is pulsed by signals from source 32, which signals are preferably obtained from a crystal oscillator powered by a low voltage source, e.g. a 12 volt battery and/or the low voltage produced by the alternator of tractor 14. The preferred signal from source 32 is illustrated at 34 in FIG. 4. The composite output from the network of strain gauges 30 constitutes a distortion of the signal 34, the amount of distortion being proportional to the weight of the vehicle 12, empty or loaded, said differential signal being passed to differential to DC analog signal converter 36. Any differential to DC analog signal converter may be utilized. The output signal 38 of the converter 36 is likewise illustrated in FIG. 4, signal segment 40 constituting the signal provided when the vehicle 12 is empty, signal segment 42 constituting the output signal when the vehicle 12 is fully loaded with foliage and the diagonal signal segment 44 constituting the signal emitted as unloading continuously and uniformly occurs. Diagonal signal segment 45 represents that interval of time during which foliage is loaded into the stack making vehicle 12 and is representative of the increase in weight resulting from continual and uniform ingress of foliage.

Signal 38 is passed from converter 36 to calibration and subtract circuit 50, where the signal is modified or calibrated to subtract or remove that portion of the signal attributable to the empty weight of the stack moving vehicle 12. Accordingly, the maximum amplitude 54 of output analog signal 52 issuing from circuit 50 precisely corresponds to and represents only the weight of the stack of foliage carried by the stack making vehicle 12. Diagonal signal segment 56 represents the foliage weight change during the interval of time when foliage is being uniformly loaded into vehicle 12 as a stack is formed in vehicle 12. Diagonal signal segment 58 represents the foliage weight change as a stack is continuously and uniformly unloaded from vehicle 12. This maximum amplitude signal segment 54 is passed to A to D converter 60 and thence placed in storage at memory 62. Any form of storage may be used, for example, mechanical counters where it is desired to avoid the need for permanent power in conjunction with electronic memory storage. The digitized signal from converter 60 is also directly visually exhibited at display 64.

Accordingly, as illustrated in FIG. 1, the present invention contemplates strain gauge weighing of the empty stack making machine 12 in transit without the need of any stationary scales installation and the requirement to travel to and from such an installation. Once a stack of foliage has been created within the stack making vehicle 12, the net strain gauge weight of the stack is determined and the cumulative weight of all stacks is tallied in memory 62 as the stacks are sequentially placed in inventory at storage site 20 (FIG. 2). Thus, the weight of each and all incoming stacks of foliage is monitored in transit and the cumulative weight tallied and retained. Accordingly, the farmer not only is aware of the number of stacks of foliage available in inventory but is informed as to the total weight of such feed available for the winter months. Moreover, this information is typically available as early as September each year. By historically knowing the number of days through the winter months when pasture is not available for livestock, the amount of winter foliage needed by the farmer may be determined based upon the number of head of stock to be fed during said winter interval and the weight of foliage per head required for proper nutrition. If desired, any excess stacked foliage in inventory may be liquidated or retained for emergency use or use in subsequent years. Any inventory deficiency may be cured at a point in time when high quality foliage may be readily purchased elsewhere at favorable prices. This avoids any winter surprise to the farmer and, further, allows the farmer to better budget his financial requirements.

The present invention also embraces dispensing foliage from inventory as feed for livestock or for subsequent processing. More particularly, in reference to FIG. 3, an available stack feeding vehicle 80 is provided and illustrated as being displaced by farm tractor 14.

The stack feeder 80 may be of any suitable type. The stack feeders disclosed in copending U.S. Application Ser. No. 917,997 and 917,994 filed June 22, 1978 and June 22, 1978, respectively, are presently preferred. U.S. Ser. No. 917,997 is now U.S. Pat. No. 4,163,524, issued Aug. 7, 1979. Alternatively, for example, the stack feeders disclosed in U.S. Pat. Nos. 3,741,051; 3,773,269; 3,830,438 and 4,037,740 may be used.

The stack feeder 80 is employed by backing the trailing end thereof into a position adjacent a selected stack 22 of foliage to be removed from inventory at storage site 20, the bed of the stack feeder 80 is placed on an incline and backed under the leading end of the stack 22 by tractor 14. Bed conveyers (not shown) of the stack feeder 80 cause the stack 22 being loaded to be progressively pulled upon the bed of the stack feeder 80 until appropriately located.

Thereafter, the tractor 14 will pull the loaded stack feeder 80 to a desired dispensing or discharging site, e.g. a field where livestock is to be fed, a bin where livestock is to be fed or a location where foliage is to be discharged for subsequent processing.

Figure 3:
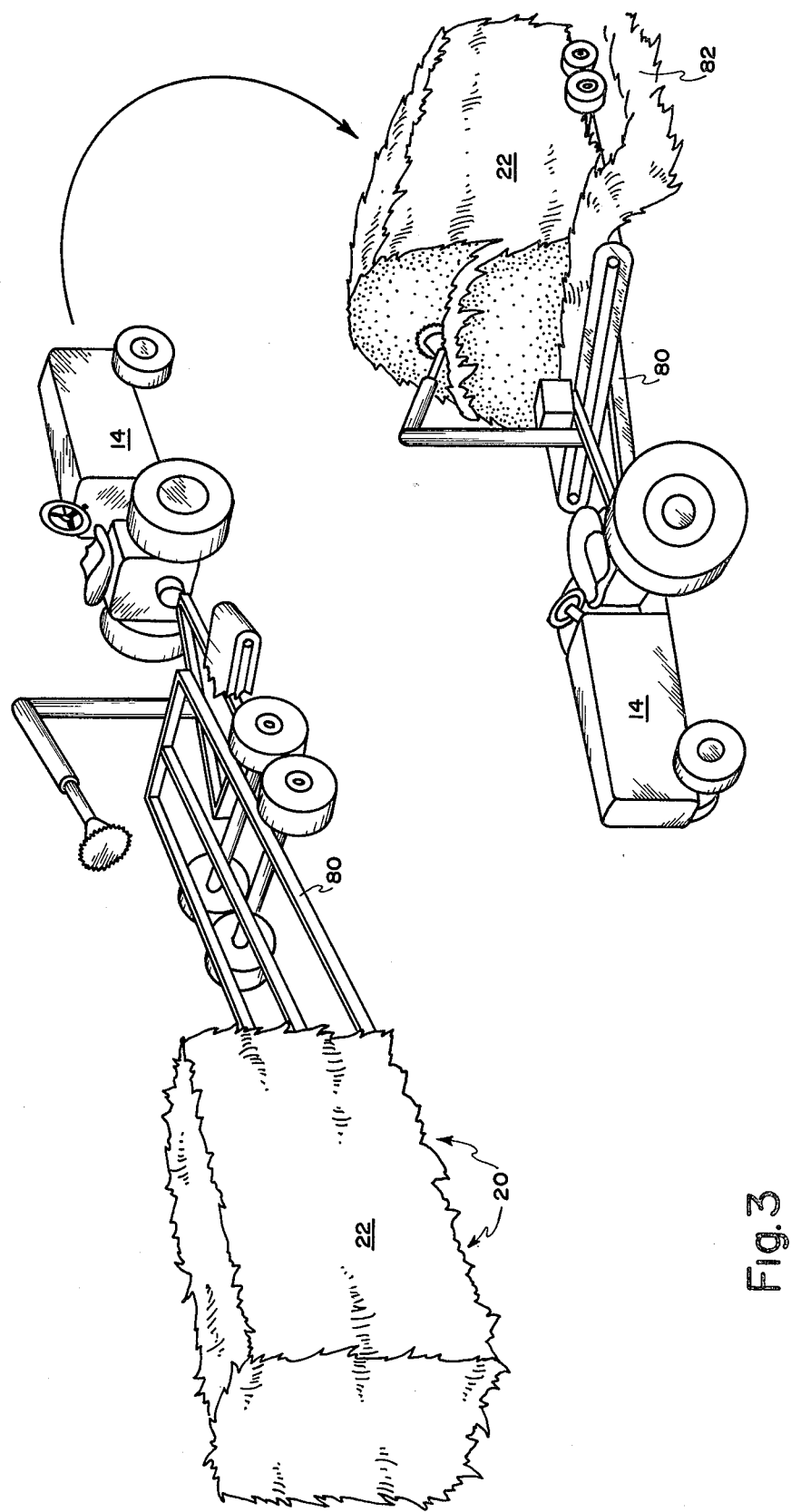
FIG. 3 is a schematic perspective representation of the manner in which stacked foliage is removed from storage and fed to livestock.

FIG. 3 schematically illustrates the slicing of strips of foliage from the leading edge of the stack as the stack feeder 80 and tractor 14 are advanced, causing the creation of a windrow 82 of sliced foliage upon the ground as the cut foliage is laterally conveyed from the stack feeder 80. The cutting cycle at the leading end of the stack 22 may be of any desired pattern, with the stack 22 being advanced between the slices. The present invention embraces controlling the magnitude of foliage so discharged to correspond precisely with the nutritional needs of the livestock to be fed or the precise amount of feed required for subsequent processing.

The frame of the stack feeder 80 is equipped with a network of strain gauges 30 (FIG. 4). The strain gauges 30 are arranged upon the frame in any suitable manner as earlier described in conjunction with the stack forming vehicle 12. Each strain gauge may be of any appropriate type, product CEA06-250VW-120, manufactured by Micro Measurements of Romulus, Mich., being presently preferred.

The strain gauges 30 are pulsed by signals 34 emanating from a source of signals 32. Preferably a low voltage source of power and a crystal oscillator are used to create said signals 34. The source of low voltage electrical power may be a 12 volt battery and/or the alternator of the tractor 14. The differential output from the network of strain gauges 30 mounted upon the stack feeding vehicle 80 constitutes a distortion of the signal 34, the magnitude of the distortion constituting the instantaneous gross weight of the stack feeder 80, loaded or empty. The circuit 46 is conventional and converts the output differential signal emanating from the network of strain gauges 30 to a DC analog output signal 38. Signal segment 40 precisely corresponds to the empty weight of the stack feeding vehicle 80. Diagonal signal segment 45 represents the progressive increase in weight as a stack 22 is continuously loaded at a constant rate upon the stack feeding vehicle 80, with signal segment 42 representing the gross weight of the stack feeder 80 fully loaded with a stack 22 of foliage. Thus, the loaded stack is weighed in transit. Diagonal signal segment 44 represents the progressive decrease in gross weight as slices are cut from the leading end of the stack (as illustrated in FIG. 3). Signal 38 at segment 44 represents that condition where the entire stack is continuously unloaded at a constant rate. Thus, unloading is continuously monitored in transit. If the entire stack were not unloaded on a continuous constant rate basis (but at different points in time, for example) diagonal signal segment 44 would not result but rather a series of stepped diagonal segments would result. The slope of any such stepped diagonal segment will change if the rate of discharge of foliage from the stack feeder 80 changes. These variations would also be true in respect to loading of the vehicle 12, if discontinuity and change in rates of stacking occurred.

In any event stack feeder signal 38 is communicated to calibration and subtract circuit 50.

Signals representative of the foliage dispensed from stack feeding vehicle 80 are communicated from circuit 50 to the A to D converter 60 and thence to memory 62 where the said signal is used to adjust the magnitude of foliage in inventory downward by corresponding amount. The cumulative amount of foliage stored in inventory is monitored and communicated from memory 62 to display 64 on a continuous basis.

Figure 6:
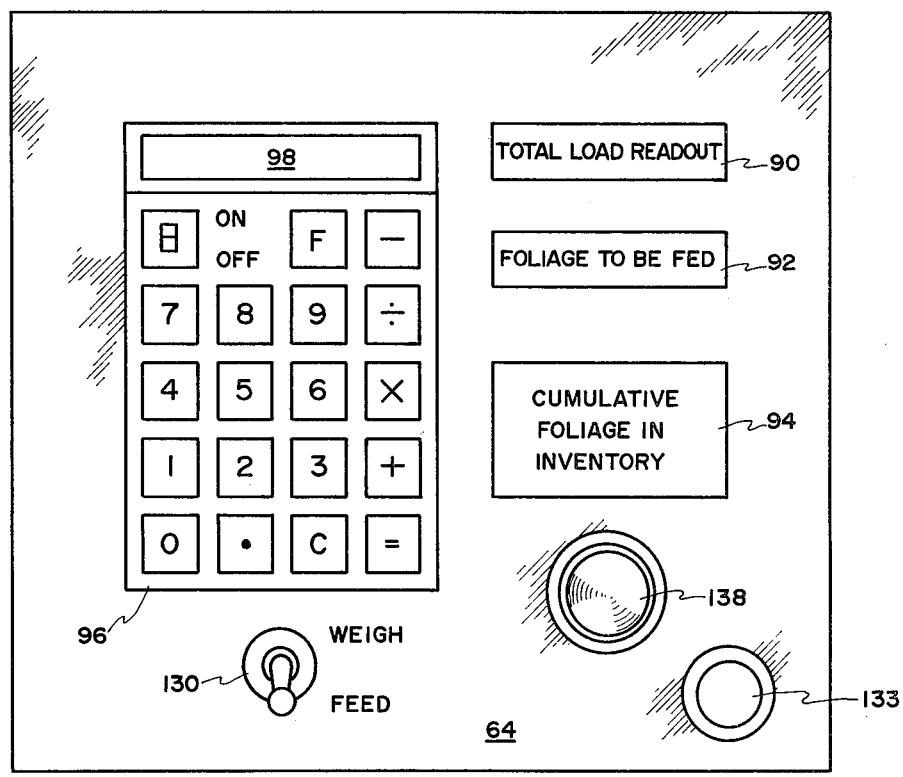
FIG. 6 is a schematic representation of the display of FIG. 4.

The display 64 may comprise at least two visual LED seven segment readouts 90 and 94. LED digital readout 90 shows the stack weight. Readout 92 illustrates the foliage desired by the farmer or user to be dispensed from the stack feeding vehicle 80 at any point in time and preferably comprises a series of thumb wheel digital dials which control the circuit 50 as later described. This amount is pre-ascertained by utilization of commercially available electronic calculator 96. (See FIG. 6.) For example, the number of head of livestock to be fed may be multiplied by the weight per head of foliage needed for good nutrition to arrive at the weight of foliage to be fed. This amount is shown at LED readout 98 of the calculator and suitably transferred to readout 92. For simplicity of circuitry, readouts 90 and 92 may be combined. The cumulative foliage remaining in inventory at any point in time is communicated from memory 62 (FIG. 4) and is shown at LED digital display 94. Display 64 also comprises a weigh/feed switch 130, a calibration knob 132 and a lamp 138 for purposes yet to be explained.

Figure 5:
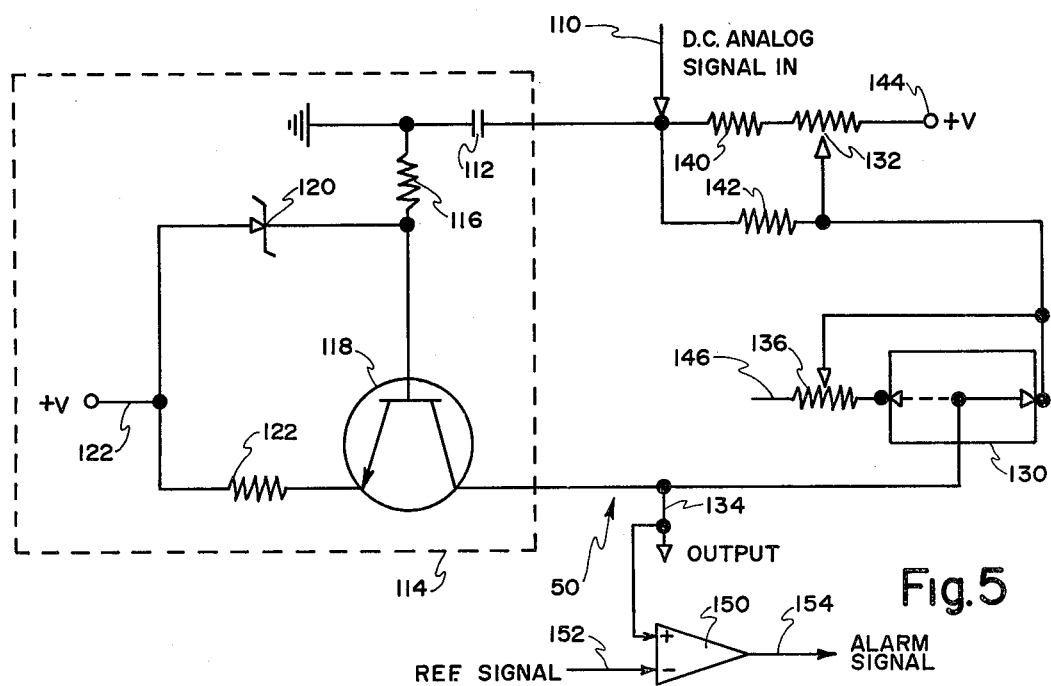
FIG. 5 is a circuit diagram of the calibration and de-subject circuit of FIG. 4.

Reference is now made to FIG. 5, which illustrates in detail the calibration and subtract circuit 50. The previously mentioned signal 38 is received along input line 110, non-polarized electrolytic capacitor 112 removes electrical noise and forms part of constant current circuit 114.

Constant current circuit 114 also comprises resistor 116 interposed between (a) ground and (b) the base of transistor 118 as well as zener diode 120. Resistor 116 biases the base of transistor 118, making the transistor conductive, and reverse biases the constant voltage zener diode 120. Resistor 122 is a constant current resistance, with a positive voltage 122 (for example plus 5 volts) being communicated to the circuit 114 intermediate the zener diode 120 and the resistor 122. Accordingly, the current of calibration and subtract circuit 50 is retained constant.

The circuit 50 is or may be part of an instrumentation package which is transferred during the fall from the stack making vehicle 12 to the stack feeding vehicle 80 after all stacks 22 have been placed in inventory, for example, at storage site 20. Likewise, in the late spring or early summer, the instrumentation package is returned to the stack making vehicle 12. Used in this fashion, the instrumentation package is provided with the capacity to be releasably coupled to a source of power and to the differential output from the network of strain gauges 30.

Calibration of the electronics to the strain gauge installation is initially achieved by placing the double throw, single pole switch 130 in the solid line position illustrated in FIG. 5. A weight of known amount is caused to be placed in the vehicle 12 or 80, as the case may be. In this way, a decoy signal similar to signal 52 will be caused to issue from circuit 50 to A to D convertors 60 and will be digitally displayed at readout 90 of display 64. Typically, the digits displayed at readout 90 will not equate to the precise weight of the item of known weight placed upon the vehicle. By manually adjusting the potentiometer 132 (FIG. 5) by its knob 133 exposed at the face of display 64 (FIG. 6), the digits shown at readout 90 are caused to equal precisely the weight of the article placed upon the vehicle. Consequently, when the calibration article of known weight is removed from the vehicle, the output at lead 134 of circuit 50 will thereafter be zero. Zero will be displayed at readout 90.

Next a stack 22 from storage site 20 is caused to be placed upon the stack feeding vehicle 80 in the fashion earlier described. When the vehicle 12 or 80 so supports a full stack 22 of foliage, the output at line 134 will include segment 54 of signal 52, which precisely represents the actual net weight of the stack upon the vehicle. This corrected or subtracted analog signal, after being processed through convertor 60, is displayed at digital readout 90 of display 64. This condition exists when the potentiometer 136 is inactivated by reason of switch 130 being in the solid line position of FIG. 5.

Thereafter, the amount of foliage to be fed is caused to be predetermined using calculator 96 and is caused to be displayed at 92 by dialing in the predetermined number or in any other suitable way. Switch 130 is moved from the solid to the dotted position of FIG. 5. Dialing in said number has the effect of adjusting the gain of potentiometer 136 to correspond and represent precisely the amount of foliage desired to be discharged. This is typically the weight of foliage needed for good nutrition so that over and under feeding is avoided.

As foliage is in fact discharged as previously described, the setting of potentiometer 136 is progressively read down until its gain equals zero exactly at a point in time when the desired amount of foliage has been dispensed from the vehicle 80. The operator is notified of this condition by warning light 138 (FIG. 6) and causes further discharge of foliage to cease. More specifically, the output on line 134 is also communicated to comparator 150 as is a constant reference signal on line 152. The reference signal on line 152 may be derived in any desired way, for example from the circuitry of FIG. 5. When the voltage of the output signal on line 134 becomes less than the voltage of the reference signal, the comparator 150 inverts and an alarm signal issues along line 154 which activates the lamp 138 (and/or an audio alarm, if desired). If desired, the signal issuing to lamp 138 may be communicated to the controls of the stack feeder to cause the cutting operation to terminate.

The amount of foliage so discharged is communicated to memory 62 resulting in a negative update in the amount of foliage remaining in inventory which adjusted amount is caused to be displayed at site 94 of display 64.

Resistors 140, 142 and 132 serve to limit current and to generate voltage drop due to constant current circuit 114. Low positive voltage is connected to terminal 144. Line 146 of circuit 50 is not connected. All power supplies must be well regulated.

It should be apparent that, if more than one stack making and/or stack feeder vehicle is used a plurality of instrumentation packages will be needed and integration of the cumulative foliage in inventory preferably determined. Also, each stack weighed in transit and placed in storage can be identified and upon subsequent placement upon a stack feeding vehicle, moisture loss during storage can be ascertained and used to properly adjust the weight of foliage in inventory.

Thus, in reference to the lower portion of FIG. 1, the present invention provides for strain gauge weighing of an empty stack feeding machine, the placement of stacks successively upon the stack feeding machine and arriving at a net strain gauge weight for each stack placed upon the stack feeding machine. A pre-selected amount only of foliage from each stack is caused to be dispensed from the stack feeding machine with appropriate read down reductions being displayed in respect to both the weight of the remainder of the stack upon the stack feeding machine and cumulative foliage remaining in inventory.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A method of in transit monitoring the magnitude of stored stacked foliage comprising the steps of:
   (a) electrically weighing in transit successive stacks of incoming foliage upon an ingress vehicle by sensing and contrasting the strain upon the vehicle when empty and on each occasion when loaded;
   (b) placing said incoming stacks in storage;
   (c) electrically cumulating in transit at the ingress vehicle the ongoing cumulative weight of stacked foliage in storage as said incoming stacks are placed in storage;
   (d) periodically removing said stacks successively from storage and place each successive stack on an egress foliage distribution vehicle;
   (e) distributing the foliage thereof as feed or for processing;
   (f) electrically ascertaining in transit at the egress vehicle the reduced cumulative weight of stacked foliage removed from storage and electrically subtractively determining at the egress vehicle in transit the cumulative amount of stacked foliage remaining in the storage.

2. An in transit method of distributing foliage comprising the steps of:
   providing an inventory of stacks of foliage having a predetermined existing cumulative weight;
   providing a stack feeder;
   electrically determining the empty weight of the stack feeder in transit by sensing the strain being imposed upon the stack feeder when empty;
   withdrawing foliage from storage by placing a stack upon the stack feeder;
   electrically determining the transit the net weight of the withdrawn stack by electrically subtractively contrasting the empty feeder weight and the the combined weight of the empty feeder and the stack when loaded;
   electrically selecting at the feeder an amount of foliage weight to be discharged from the loaded stack feeder;

cutting foliage from the stack and discharging the cut foliage from the stack feeder on a substantially continuous basis;

electrically monitoring in transit the weight of foliage cut and discharged by sensing the change in strain imposed upon the stack feeder by the feeder and the foliage during cutting and discharge;

ceasing cutting and discharging foliage from the feeder when the weight of foliage cut and discharged equals the weight of foliage electrically selected.

3. An in transit method of controlling the dispensing of foliage comprising the steps of:

placing a stack of foliage having a known weight upon a dispensing vehicle;

predetermining an amount of foliage by weight to be dispensed from the stack upon the vehicle;

cutting foliage from the stack and dispensing the cut foliage from the vehicle;

electrically monitoring at the vehicle in transit the cumulative weight of foliage so cut and dispensed.

electrically comparing at the vehicle in transit said cumulative amount with said predetermined amount;

electrically providing notification at the vehicle in transit when said two amounts are equal.

4. A method of monitoring stacks of foliage comprising the steps of:

creating man-made stacks of foliage in the field;

weighing in transit each stack as it is transported on a stack vehicle;

placing each stack in storage;

cumulating at the stack vehicle in transit the weights of all stacks placed in storage;

from time to time loading a stored stack of foliage upon a dispensing vehicle without regard to the weight of said loaded stored stack but in reference to the cumulated weight of all stacks in storage;

pre-ascertaining the weight of foliage to be dispensed from the loaded stack at any point in time;

cutting foliage from the loaded stack and dispensing the cut foliage from the vehicle;

monitoring in transit the weight of foliage so cut and dispensed;

comparing the dispensed weight with the pre-ascertained weight;

providing notification when the mentioned two weights are equal;

reducing the cumulated weight of all stacks remaining in storage by the weight of foliage withdrawn from storage and dispensed.

5. A system for controlling the creation, storage and dispensing of foliage comprising:

at least one stack making vehicle;

at least one stack storage site;

at least one stack feeding vehicle;

means for weighing each vehicle, loaded and empty, in transit;

means for determining the net weight of each stack made by the stack making machine, before placing the stack in storage at said site;

means cumulating the net weights of all stacks placed in storage;

means for pre-ascertaining the weight of foliage to be dispensed from each stack placed upon the stack feeding vehicle and removed from storage without regard to the weight of any stack placed upon the stack feeding vehicle;

means determining in transit the weight of foliage dispensed from the stack upon the stack feeding vehicle;

means sensing when the weight of foliage so dispensed equals the pre-ascertained weight and issuing a notification of that fact;

means negatively updating the cumulative weight of foliage in storage, taking into account the foliage withdrawn and dispensed.

* * * * *